(12) United States Patent
Rains

(10) Patent No.: US 8,528,743 B1
(45) Date of Patent: Sep. 10, 2013

(54) STRAINER FOR USE WITH THE OUTLET OF A CONTAINER

(76) Inventor: Jerry T. Rains, Houston, TX (US)

( * ) Notice: Subject to any disclaimer, the term of this patent is extended or adjusted under 35 U.S.C. 154(b) by 0 days.

(21) Appl. No.: 13/089,285

(22) Filed: Apr. 18, 2011

Related U.S. Application Data

(62) Division of application No. 11/622,926, filed on Jan. 12, 2007, now abandoned.

(60) Provisional application No. 60/765,501, filed on Feb. 6, 2006.

(51) Int. Cl.
*B01D 29/00* (2006.01)
*B01D 35/00* (2006.01)
*B01D 29/88* (2006.01)
*B01D 35/02* (2006.01)

(52) U.S. Cl.
USPC ............ 210/459; 210/172.1; 210/172.2; 210/232; 210/244; 210/248; 210/455; 210/460; 210/463; 210/464; 210/467; 210/468; 210/497.01

(58) Field of Classification Search
USPC .................................. 210/460, 462, 463, 464
See application file for complete search history.

(56) References Cited

U.S. PATENT DOCUMENTS

| | | | | |
|---|---|---|---|---|
| 1,116,234 A | * | 11/1914 | Brown | 210/460 |
| 1,694,743 A | * | 12/1928 | Hinman | 210/460 |
| 1,967,785 A | * | 7/1934 | Schacht | 210/463 |
| 2,437,008 A | * | 3/1948 | Van Doehren | 210/167.02 |
| 4,303,519 A | * | 12/1981 | DelVecchio | 210/238 |
| 5,858,234 A | * | 1/1999 | Sukun | 210/460 |

\* cited by examiner

*Primary Examiner* — Benjamin Kurtz
(74) *Attorney, Agent, or Firm* — Kenneth A. Roddy

(57) ABSTRACT

A strainer for installation on a drain outlet of a container, such as an ice chest, has a housing including a backing plate and a cover, and a tubular drain engagement member releasably connected to the backing plate. The housing may be installed either by connecting the drain engagement member to the backing plate and fitting the tubular drain engagement member into the drain outlet, or by removing the tubular drain engagement member from the backing plate, securing the backing plate over the drain outlet with a nut, and installing the cover onto the backing plate to cover the drain outlet. The housing has a plurality of apertures formed therethrough in communication with the interior of the housing that allow liquid to pass through the drain outlet, while effectively preventing various sizes, shapes and types of debris from entering and clogging the drain outlet.

5 Claims, 4 Drawing Sheets

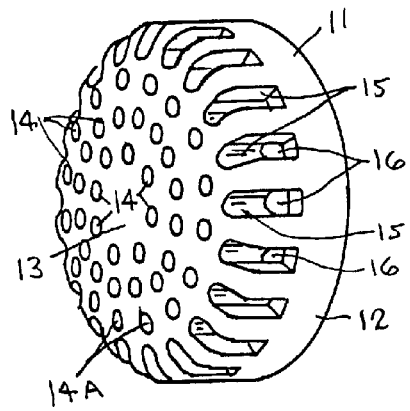
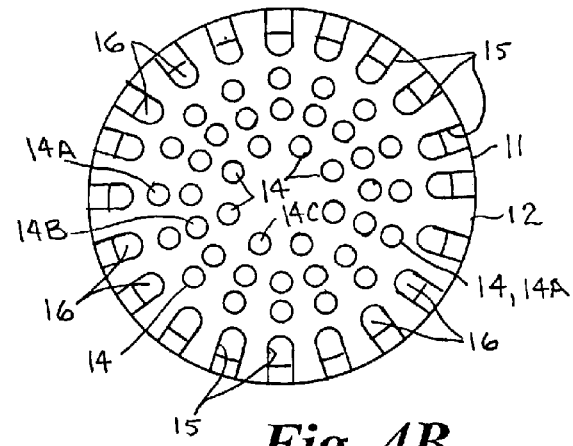
Fig. 4A                Fig. 4B
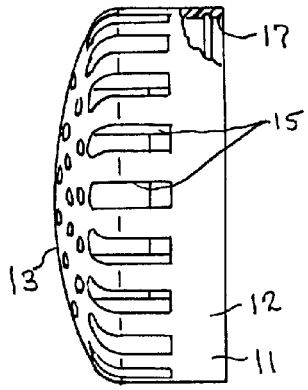
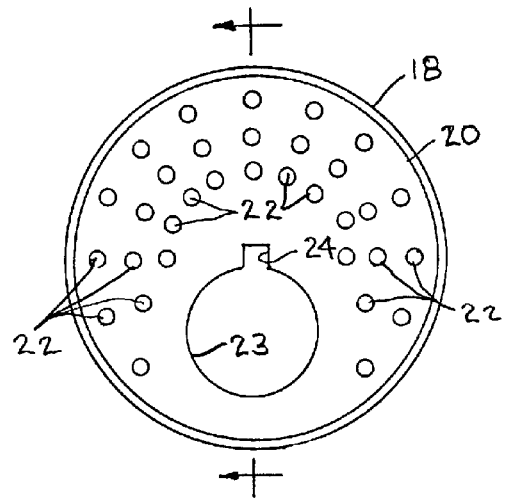
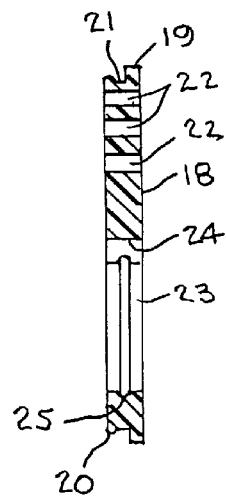
Fig. 4C        Fig. 5        Fig. 6
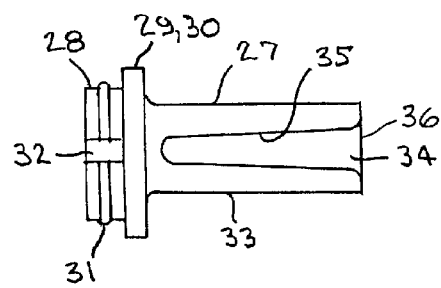
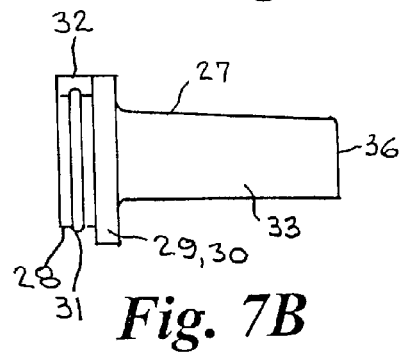
Fig. 7A                Fig. 7B

STRAINER FOR USE WITH THE OUTLET OF A CONTAINER

CROSS REFERENCE TO RELATED APPLICATIONS

This application is a Divisional of and claims priority of U.S. patent application Ser. No. 11/622,926, filed Jan. 12, 2007 now abandoned, which claims priority of U.S. Provisional Patent Application Ser. No. 60/765,501, filed on Feb. 6, 2006.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to straining devices. More particularly, the present invention relates to a strainer device that is installed on the drain outlet of a container, such as an ice chest to prevent clogging or restriction of the flow passage of the drain outlet of the container.

2. Description of Related Art Including Information Disclosed Under 37 CFR 1.97 and 37 CFR 1.98.

Conventionally, ice chests are used in a wide variety of applications. In many circumstances, these ice chests contain ice and a wide assortment of other materials, such as food. In certain circumstances, debris accumulates within the ice chest, along with the ice and the food. This debris can be in the form of wrappers, leaves, sticks, paper products, and food particles.

As the ice melts within the ice chest, it is often necessary to drain the liquid that has accumulated within the ice chest. The draining of the liquid will serve to reduce the weight of the contents of the ice chest. Additionally, the draining of the liquid will allow the user to introduce more ice into the interior of the container. In other circumstances, when it is desired to clean the ice chest, the liquid is drained through a drain outlet in a sidewall of the ice chest. The drain outlet is typically a tubular member that extends from the interior of the ice chest so as to have a portion extending outwardly of the wall of the ice chest. The drain outlet can also be in the form of a spigot that allows for the selective draining of the contents of the ice chest. Typically, a closure member is placed over the end of the end of the tubular member so as to prevent the unintended release of liquid from the interior of the ice chest. When desired to release the liquid from the interior of the ice chest, the closure member is removed or the spigot is opened so that water and other liquids easily drain from the interior of the ice chest.

Unfortunately, the flow of the liquid from the interior of the ice chest outwardly through the drain outlet or spigot causes the residual debris within the interior of the ice chest to pass toward the outlet. Eventually, the debris will accumulate along the inner wall of the ice chest and adjacent to the outlet so as to restrict the flow of liquid from the interior of the ice chest. When this occurs, it is necessary to reach into the interior of the ice chest and remove the debris. This is often an inconvenient and time-consuming procedure. In other circumstances, the accumulation of debris occurs so frequently that it is easier to simply dump the contents of the ice chest through the top opening of the ice chest. Under these circumstances, the desired contents of the ice chest may also spill outwardly of the ice chest. As such, a need has developed so as to effectively prevent the debris within the interior of the ice chest from clogging the outlet spigot.

In the past, various patents have issued relating to such straining devices. For example, U.S. Patent Publication No. 2004/0069009, published on Apr. 15, 2004 to C. K. Tedder, teaches an adjustable, removable shelving system for separating items stored in a cooler from ice or water in the cooler. This shelf includes a plurality of openings formed therein so as to allow water from melted ice to drain to the base of the ice chest. The space between the shelf and the base of the ice chest communicates with the outlet spigot. As such, these apertures tend to filter a certain amount of the debris from ever reaching the outlet spigot. However, the use of such a shelving system minimizes the amount of space available for storage within the interior of the ice chest.

U.S. Patent Publication No. 2005/0048889, published on Mar. 3, 2005 to D. L. Barron, shows a container for scaling fish. The drain includes a guard or screen thereon so as to prevent the passage of fish scales or similarly-sized particles therethrough. A fish is placed in the container and scaled. When scaling has been completed, the water is drained from the container. These scales carried to the drain by the water flow are captured by the guard for ease of removal.

U.S. Pat. No. 1,613,468, issued on Jan. 4, 1927 to H. J. McClafferty, describes a refrigerator having a drain pan thereon. This drain pan allows liquid to pass to a filtering system which can then be opened so as to allow liquids to be drained therefrom.

U.S. Pat. No. 1,912,159, issued on May 30, 1933 to L. Piro, describes a spigot. This spigot has a screen over an interior surface thereof. This screen serves to filter particles passing through the spigot.

U.S. Pat. No. 2,270,726, issued on Jan. 20, 1942 to Elze et al., describes a melting kettle for tar and asphalt. This melting kettle includes an outlet having a screen positioned thereover for filtering particles passing to the outlet. The outlet spigot has a valve thereon for controlling the flow of liquid outwardly from the outlet.

U.S. Pat. No. 2,305,582, issued on Dec. 15, 1942 to Kennedy et al., describes an amputation ice chest. This amputation ice chest has an interior volume with an outlet extending through one of the walls of the ice chest. A screen is placed over the outlet so as to prevent debris from passing outwardly of the outlet.

U.S. Pat. No. 6,082,589, issued on Jul. 4, 2000 to Ash et al., teaches a slush beverage dispensing system. A slush delivery valve is located on the side wall of the vessel side and has an outlet end to which a dispensing nozzle or a flexible insulated hose having a dispensing nozzle can be releasably connected. A filtering system is placed within the hose so as to control the flow of liquids outwardly of the dispensing nozzle.

U.S. Pat. No. 6,836,910, issued on Jan. 4, 2005, to G. S. Cawthon, provides a portable sink for connection to an existing water supply. A strainer is connected to the drain so as to prevent particles from passing outwardly of the outlet.

It is an object of the present invention to provide a strainer that can be easily connected and/or retrofitted to the outlet of an existing ice chest.

It is a further object of the present invention to provide a strainer which effectively removes potentially clogging particles from accumulating at the outlet of the ice chest.

It is a further object of the present invention to provide a strainer for use with an ice chest that effectively strains those particles adjacent to the bottom of the ice chest from passing to the outlet.

It is another object of the present invention to provide a strainer for use with an ice chest that continues to effectively allow for the release of liquid even though some of the apertures of the strainer are clogged.

It is a further object of the present invention to provide a strainer for use with an ice chest that is easy to install, easy to use and relatively inexpensive.

These and other objects and advantages of the present invention will become apparent from a reading of the attached specification and appended claims.

BRIEF SUMMARY OF THE INVENTION

The present invention is a strainer for use with a drain outlet of a container, the strainer having a tubular drain engagement member with a diameter suitable for fitting into the outlet of the container and a housing having a plurality of apertures formed therethrough connected to the tubular drain engagement member. The plurality of apertures are formed through a wall of the housing so as to communicate with an interior of the housing. The housing is connected to the tubular drain engagement member such that a liquid passing through the plurality of apertures passes to the housing interior and through the tubular drain engagement member.

In the present invention, the housing includes a cover having the plurality of apertures formed therethrough and a backing plate affixed to the cover. The backing plate is affixed over the tubular member. The cover has a dome-shaped surface facing away from the tubular member. The plurality of apertures are formed through the dome-shaped surface. In the preferred embodiment of the present invention, the plurality of apertures includes a first circular pattern of holes formed through the dome-shaped surface, a second circular pattern of holes formed on through the dome-shaped surface inwardly of the first circular pattern of holes, and a third circular pattern of holes formed through the dome-shaped surface inwardly of the second circular pattern of holes. The cover has a generally cylindrical side wall portion extending from the dome-shaped surface. A plurality of circumferentially spaced inwardly recessed slots extend from the dome-shaped surface and terminate near the bottom of the cylindrical portion defining openings to an interior of the housing.

The cover is engaged in snap-fit relation with the backing plate. The backing plate has a plurality of holes formed therethrough so as to open to an interior of the housing.

The exterior of the tubular member has a generally cylindrical end portion with a generally rectangular tongue extending radially outwardly therefrom. The exterior of the tubular member also has a radial flange formed thereon adjacent to the generally cylindrical end portion defining a circular abutment surface. The circular abutment surface has a diameter greater than the generally cylindrical end portion. The backing plate has an opening with a generally rectangular slot extending radially outward therefrom. The opening in the backing plate is affixed over the generally cylindrical end portion. The generally rectangular tongue extends into the slot. The backing plate is positioned against the abutment surface. The tubular drain engagement member also has an elongate tubular drain engaging end portion with a tapered slot formed through the side wall thereof extending longitudinally along the elongate tubular end portion.

In the present invention, the housing has a generally circular outer circumference. The tubular drain engagement member is connected to the housing so as to be offset from the center of the circular cross section circumference. As such, the housing can be suitably rotated relative to the outlet of the container so as to have an outer surface residing against the bottom of the container. The backing plate is spaced a small distance from the inner wall of the container adjacent to the outlet.

In the preferred embodiment of the present invention, the container is an ice chest. The drain outlet is positioned in the wall of the ice chest and extends outwardly beyond this wall of the ice chest. Also, in the preferred embodiment of the present invention, the backing plate has a reduced diameter on one side with a circumferential annular bead formed therearound. The cover has an inner diameter with an annular channel for receiving the bead of the backing plate. As such, the cover can be snap fit onto the backing plate.

In an alternate mounting arrangement of the present invention, the drain outlet of the container has a tubular portion affixed so as to extend through a wall of the container, the tubular portion having an outlet end and an opposite threaded end. The opening in the backing plate is slidably positioned over the threaded end of the tubular drain outlet so as to have a surface adjacent the wall of the container. A nut is threadedly secured over the threaded end of the tubular portion of the drain outlet so as to be juxtaposed against an opposite surface of the backing plate. The cover is affixed over the backing plate such that the nut and the threaded end of the tubular portion of the drain outlet are positioned within the interior of the cover. A washer may be interposed between the surface of the backing plate and the wall of the container.

BRIEF DESCRIPTION OF THE SEVERAL VIEWS OF THE DRAWINGS

FIGS. 4A, 4B and 4C are a perspective view, a top plan view, and a side elevation view, respectively, of the cover of the housing of the strainer of the present invention, a portion of the side wall cut away in FIG. 4C to show the annular channel in the interior.

FIG. 5 is a top plan view of the backing plate of the housing of the strainer of the present invention FIG. 6 is a cross sectional view of the backing plate taken along line 6-6- of FIG. 5.

FIGS. 7A and 7B are a top view and a side view, respectively, of the tubular drain engaging member of the strainer of the present invention.

DETAILED DESCRIPTION OF THE INVENTION

Figure 1:
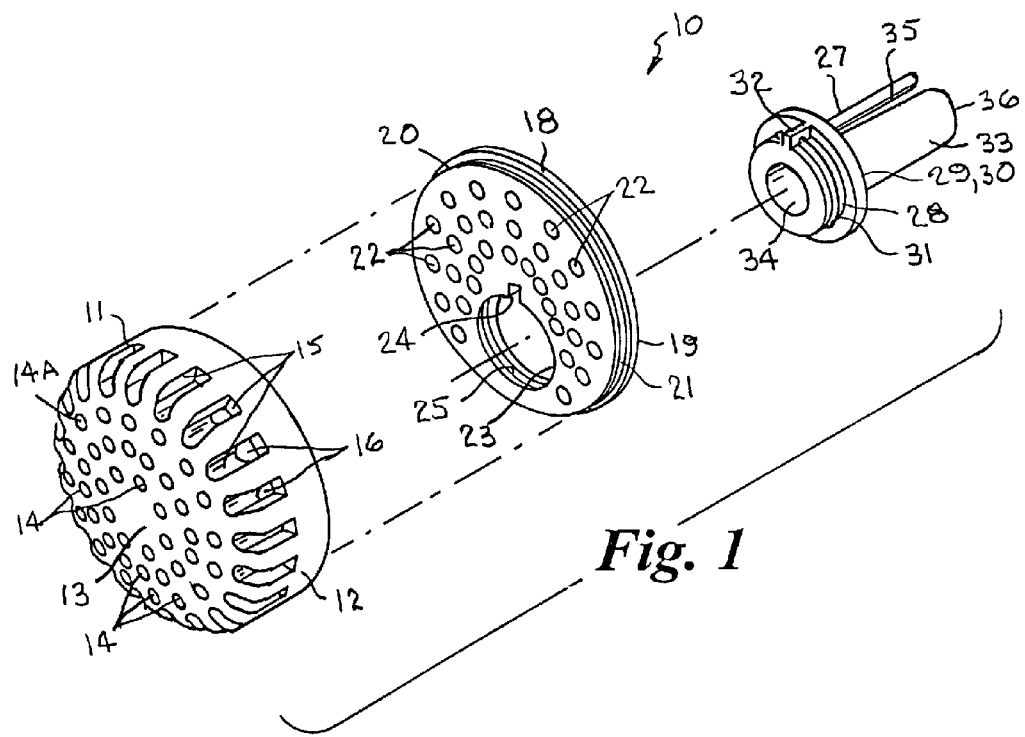
FIG. 1 is an exploded perspective view of the components of the strainer in accordance with the present invention, shown in an unassembled condition.
Figure 2:
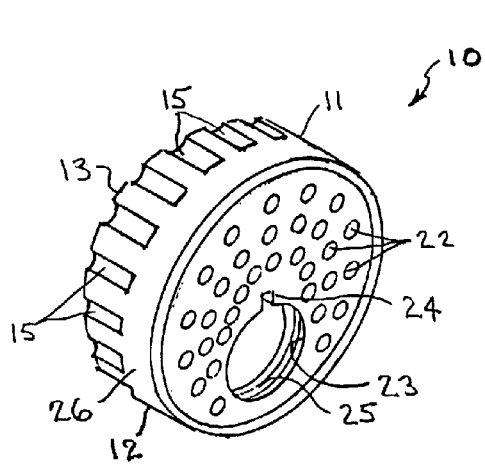
FIG. 2 is an exploded perspective view of the cover and the backing plate components of the strainer in an assembled to form the housing of the strainer.
Figure 3:
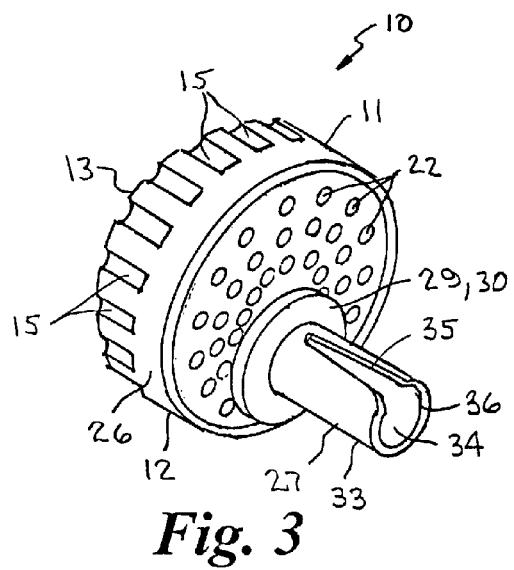
FIG. 3 is an exploded perspective view of the strainer showing the tubular drain engagement member installed in the backing plate of the assembled housing.

FIG. 1 shows the components of the strainer 10 in an unassembled condition, and FIGS. 2 and 3 show the components in various stages of assembly. The strainer 10 includes a cover 11, a backing plate 18, and a tubular drain engaging member 27. As described hereinafter, the cover 11 and the backing plate 18 are assembled together to form a housing 26, and the tubular drain engaging member 27 is removably connected with the backing plate of the housing for installing the strainer on the drain outlet of a container.

Referring additionally to FIGS. 4A, 4B and 4C, the cover 11 has a generally cylindrical side wall portion 12 with an open end and a dome-shaped surface 13 at the opposed end. A plurality of apertures 14 are formed through the dome-shaped surface 32. A plurality of arcuate recessed slots 15 are formed in the cylindrical side wall portion 12 of the cover in circumferential radially spaced relation and extend longitudinally from the dome-shaped surface and terminate a distance from the open end of the cover to define apertures 16 spaced radially inward from the generally cylindrical side wall portion that open to the interior of the cover 11. An annular bead 17 is formed on the interior surface at the open end of the cylindrical side wall portion 12 of the cover 11.

Referring additionally to FIGS. 5 and 6, the backing plate 18 has a circular configuration with a larger diameter portion 19 and a reduced diameter portion 20 on one side thereof with a circumferential annular channel 21 formed thereon for receiving and engaging the annular bead 17 on the interior surface of the cylindrical side wall portion 12 of the cover 11. A plurality of smaller holes 22 are formed through the backing plate 18. An opening or larger diameter hole 23 is formed through the backing plate 18 and disposed offset a distance from the center of the backing plate. A generally rectangular slot 24 extends radially outward a short distance from the hole 23 and through the backing plate 18. An annular channel 25 is formed on the inside diameter of the hole 23.

When the open end of the cylindrical side wall portion 12 of the cover 11 is pressed onto the reduced diameter 20 of the backing plate 18, the annular bead 17 on the interior surface of the cover engages the circumferential annular channel 21 of the backing plate in a snap fit relation such the backing plate is retained on the cover and encloses the open end of the cover, and the assembled cover and backing plate form a hollow housing 26 as seen in FIG. 2. The apertures 14, 16 in the cover 11 and the holes 22 in the backing plate 18 will allow liquid to pass therethrough and into the interior of the housing 26. The domed-shape of the cover 11, the recessed slots 15, and apertures 16 at the bottom of the slots effectively prevent debris from clogging all of the apertures located on the cover.

As best seen in FIG. 4B, in the illustrated example, the apertures 14 of the dome-shaped portion of the cover 11 may be arranged in a unique pattern. There is shown a first plurality of outer holes 14A in a generally circular pattern, a second generally circular pattern of holes 14B spaced inwardly of the first circular pattern of holes, and a third generally circular pattern of holes 14C spaced inwardly of the second circular pattern of holes.

Referring additionally to FIGS. 7A and 7B, the tubular drain engagement member 27 has a shorter generally cylindrical end portion 28 with an inwardly adjacent radial flange 29 formed thereon of larger diameter defining a circular abutment surface 30. A circumferential annular bead 31 is formed on the generally cylindrical end portion 28. A generally rectangular tongue 32 extends radially outward from and longitudinally along the cylindrical end portion 28 from the abutment surface 30. The cylindrical end portion 28 and the tongue 32 are sized to be received in the hole 23 and the rectangular slot 24 of the backing plate 18, respectively. The circumferential annular bead 31 is sized to engage the annular channel 25 on the inside diameter of the hole 23 in the backing plate 18 in snap fit relation. A longer tubular drain engaging portion 33 extends from the radial flange 29 in opposed relation to the cylindrical end portion 28 to be received within the drain outlet of the container. A central fluid passageway 34 extends through the tubular drain engagement member 27. A longitudinal tapered slot 35 extends along the tubular drain engaging portion 33 of the tubular drain engagement member 27. The tapered slot 35 diverges outwardly along it length so as to have the greatest width adjacent the terminal end 36 of the tubular drain engaging portion 33. The tapered slot 35 allows the tubular drain engaging portion 33 to flex radially inward at the outer end 36 so as to allow the user to fit the tubular drain engagement member 27 within the drain outlet.

Figure 8:
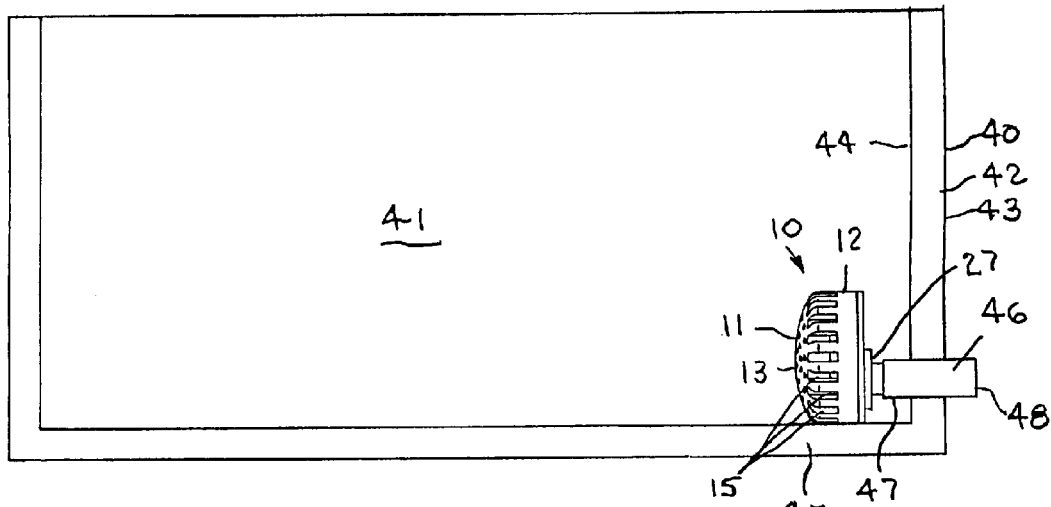
FIG. 8 is a cross-sectional view showing the strainer of the present invention with the tubular drain engaging member installed in a drain outlet within the interior of an ice chest.
Figure 9:
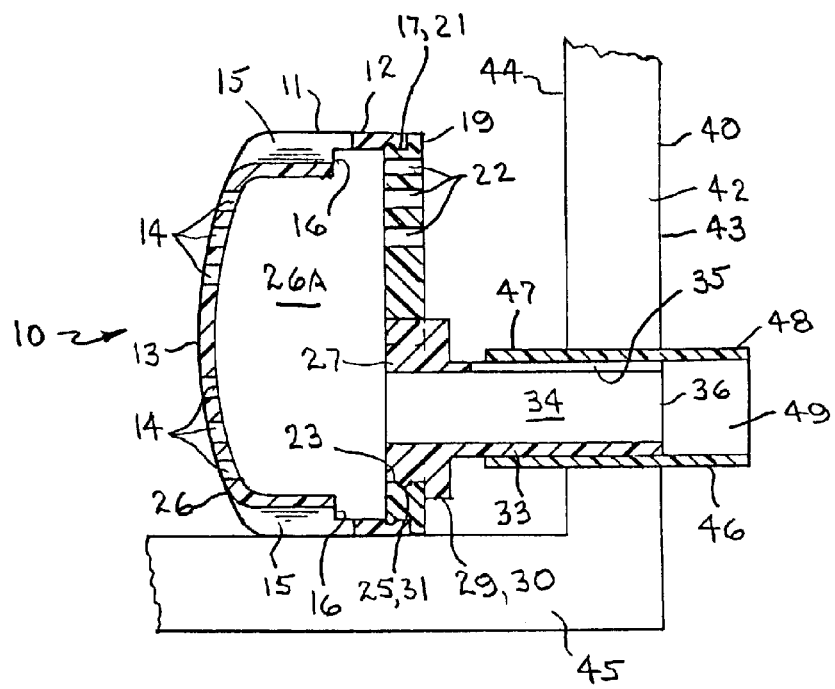
FIG. 9 is an enlarged cross-sectional view showing the tubular drain engaging member installed in a drain outlet within the interior of an ice chest in greater detail.

Referring to FIGS. 8 and 9, the strainer 10 in accordance with the present invention is shown assembled as shown in FIG. 3 and installed on the drain outlet 46 of a container 40. The strainer components previously described are assigned the same numerals of reference, but are not described again in detail to avoid repetition. The container 40 has an interior volume 41 suitable for the receipt of ice and other articles therein, such as an ice chest. The exemplary drain outlet 46 is a tubular drain outlet that extends through a wall 42 of the container 40 and has an inlet end portion 47 that is disposed in the interior of the container and an outer end portion 48 that extends outwardly beyond the exterior side 43 of the wall 42, and a central fluid passageway 49 extending therethrough. The strainer housing 26 is located within the interior volume 41 of the container 40 adjacent to the bottom 45 of the container. The tubular drain engagement member 27 extends from the housing 26 so as to be received and frictionally engaged within the central fluid passageway 49 of the drain outlet 46 to prevent accidental dislodgement, and the housing may be rotated to engage an outer surface thereof on the bottom 45 of the container 40. The tapered slot 35 allows the outer end 36 of the tubular drain engaging portion 33 of the tubular drain engagement member 27 to flex radially inward to facilitate insertion into the drain outlet 46 and accommodate outlets of different inside diameters. In the installed position, the abutment surface 30 is positioned generally adjacent to the inner facing end 47 of the drain outlet 46.

When debris is accumulated within the interior volume 41 of the container 40, the strainer 10 will effectively prevent the debris from clogging the drain outlet 46. The plurality of holes 14, 22, slots 15 and apertures 16 in the cover 11 and backing plate 18 will allow liquid to pass therethrough while generally preventing debris from entering the interior 26A of the housing 26. The non-planar dome-shaped surface 13 and cylindrical side wall 12 configuration of the cover 11 will effectively prevent flat objects from covering all of the holes and apertures. Even if all of the holes of the cover should happen to be covered, liquid will still flow through the slots 15 and apertures 16 in the generally cylindrical side wall portion 12. By rotating the housing 26 to engage the bottom 45 of the container 40, debris residing on the bottom will also be effectively prevented from the clogging the drain outlet 46. Thus, liquid will pass through the holes and apertures into the housing interior 26A, through said central fluid passageway 34 of the tubular drain engagement member 27, and through the central fluid passageway 49 of the existing drain outlet 46 to the exterior of the container 40, while effectively preventing all sizes, shapes and types of debris from clogging the drain outlet.

Figure 10:
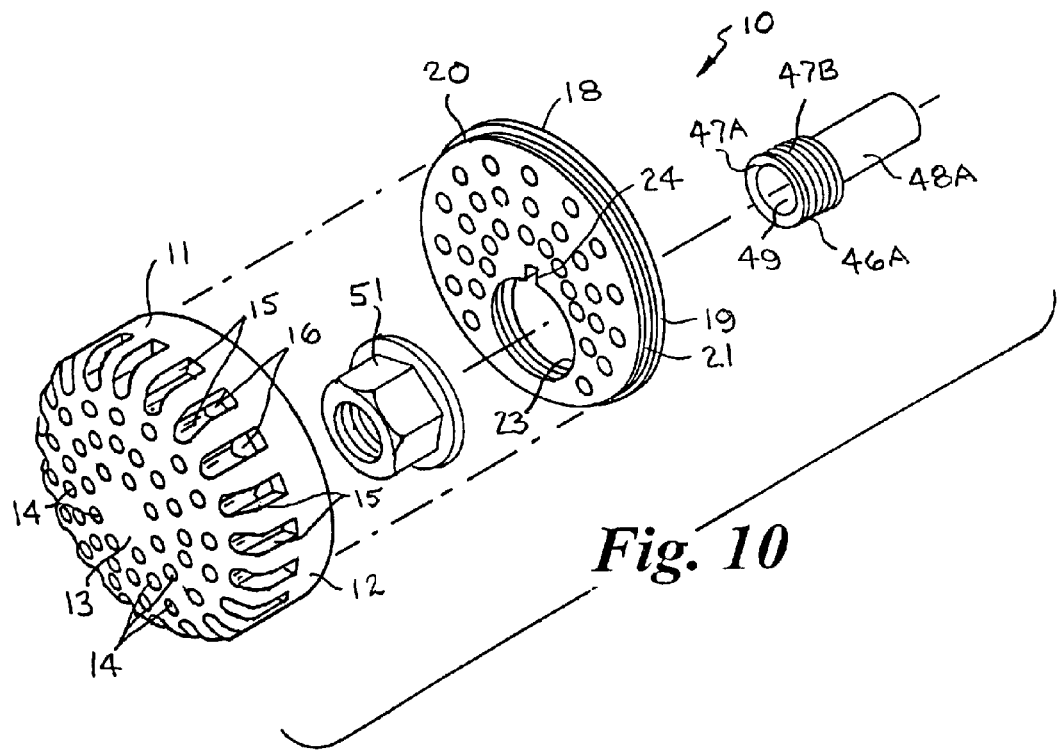
FIG. 10 is an exploded perspective view of the cover and the backing plate components of the strainer in an unassembled condition for installation on the threaded end of a drain outlet within the interior of the ice chest.
Figure 11:
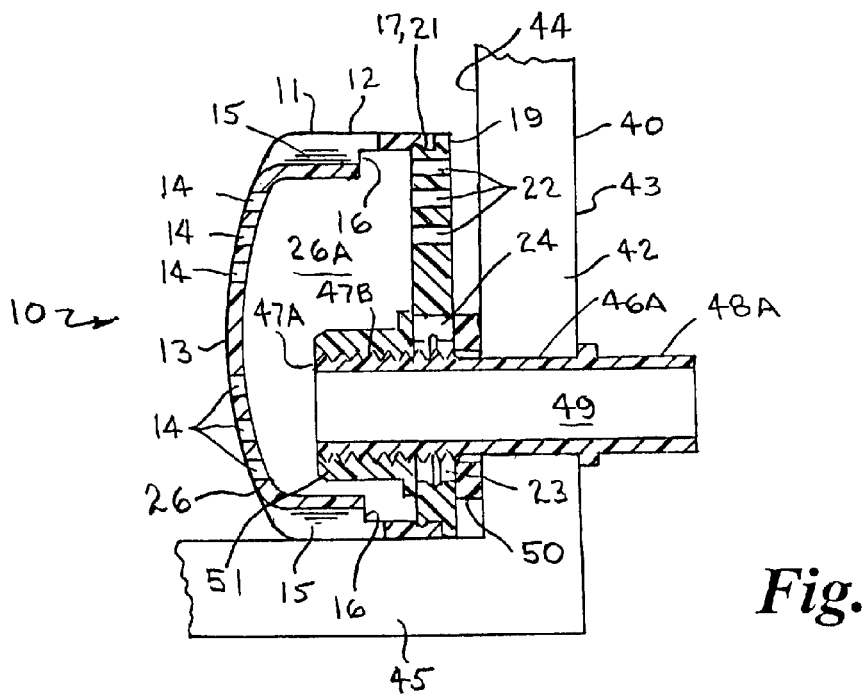
FIG. 11 is an enlarged cross-sectional view showing the housing of the strainer of the present invention installed on the threaded end of the drain outlet within the interior of the ice chest in greater detail.

Referring to FIGS. 10 and 11, there is shown an alternative method of mounting the strainer in accordance with the teachings of the present invention. The strainer components previously described are assigned the same numerals of reference, but are not described again in detail to avoid repetition. In this method, the tubular drain engagement member 27 is not used and the cover 11 and backing plate 18 are assembled together over the inlet end of the drain outlet 46A of the container 40. As described above, the container 40 has an interior volume 41, a side wall 42, and a bottom 45 suitable for the receipt of ice and other articles therein, such as an ice chest. In this example, the exemplary drain outlet 46A is a tubular drain outlet that is affixed in liquid-tight relationship through the wall 42 of the container 40 and has an inlet end 47A that is disposed in the interior of the container and an outer end portion 48A that extends outwardly beyond the exterior side 43 of the wall 42, and a central fluid passageway 49 extending therethrough. The inlet end 47A is provided with external threads 47B. This type of drain outlet is widely used in many commercially available ice chests, wherein the drain outlet or drain plug is secured through the wall of the by a washer and a nut installed on the threaded portion of the outlet.

In FIGS. 10 and 11, it can be seen that a washer 50 and the backing plate 18 of the housing 26 is placed over the inlet end 47A of the drain outlet 46A such that the externally threaded portion 47B extends through the washer and the hole 23 of the backing plate, and the larger diameter 19 of the backing plate is facing the inner side 44 of the wall 42 with the washer interposed between the backing plate 18 and the inner facing surface 44 of the wall 42. A nut 51 is threadedly secured over the threaded portion 47B at the end 47A of the drain outlet 46A to secure the backing plate 18 and washer adjacent to the wall 42 of the container 40. The cover 11 is then snap fit onto the backing plate 18.

The foregoing disclosure and description of the invention is explanatory and illustrative of the present invention. Variations in the details of the illustrated construction can be made within the scope of the appended claims without departing from the true spirit of the invention. The present invention should only be limited by the following claims and their legal equivalents.

The invention claimed is:

1. A strainer for installation on an existing tubular drain outlet in the wall of a container having an interior and exterior, the existing tubular drain outlet having an externally threaded tubular portion disposed on the interior of the container for threadedly receiving a nut and a central fluid passageway extending therethrough in communication with the interior of the container and the exterior of the container, the strainer comprising:

a generally flat circular backing plate having a central axis, an offset larger hole therethrough disposed in offset relation to said central axis sized to receive the threaded portion of the existing tubular drain outlet therethrough and allow relative rotation therebetween, a plurality of smaller holes therethrough, and snap fit cover engagement means on the circumference thereof for releasably engaging a cover;

a generally dome-shaped cover having a dome-shaped end surface and a generally cylindrical peripheral side wall defining an interior, a plurality of holes extending through said dome-shaped end surface, a plurality of circumferentially spaced inwardly recessed slots extending from said dome-shaped surface of said cover and terminating near a bottom of said peripheral side wall in inwardly spaced relation relative thereto defining openings into said interior of said cover at a terminal end of said recessed slots, and snap fit backing plate engagement means thereon for releasably engaging said cover engagement means of said backing plate, said dome-shaped end surface and said generally cylindrical peripheral side wall configuration of said cover preventing debris and flat objects from covering all of said holes, said slots, and said openings of said cover;

said snap fit cover engagement means on said backing plate circumference comprising a circumferential bead, and said snap fit backing plate engaging means on said cover comprising an annular channel in an interior surface of said cylindrical peripheral side wall of said cover, or vice versa, configured to removably engage said cover on said backing plate in snap-fit relation; and a nut adapted to be threadedly engaged on the threaded portion of the existing tubular drain outlet;

said backing plate adapted to be removably mounted on the existing tubular drain outlet with the threaded portion of the tubular drain outlet extending through said offset larger hole in said backing plate and said nut threadedly engaged thereon; and said cover removably engaged in snap fit relation on said backing plate to surround the externally threaded portion of the existing tubular drain outlet, said nut, and the central fluid passageway of the existing tubular drain outlet; wherein said smaller holes of said backing plate and said holes, said recessed slots and said openings of said dome-shaped cover allow a liquid in the interior of the container to pass therethrough into said cover interior and through the central fluid passageway of the existing tubular drain outlet to the exterior of the container, while preventing debris and objects from entering said cover interior and clogging or restricting the existing tubular drain outlet; and said offset larger hole through said backing plate is offset relative to said central axis a sufficient distance such that said cover and said backing plate are rotatable as a unit eccentrically about the existing tubular drain outlet to engage a circumferential portion of said generally cylindrical peripheral side wall of said cover on a bottom wall of the container to prevent debris and objects residing on the bottom wall of the container from covering said slots and openings disposed on the engaged circumferential portion of said side wall while allowing liquids to pass therethrough into said cover interior and through the central fluid passageway of the existing tubular drain outlet to the exterior of the container.

2. A strainer apparatus for installation on an existing tubular drain outlet in the wall of a container having an interior and exterior, the existing tubular drain outlet having an externally threaded tubular portion disposed on the interior of the container for threadedly receiving a nut and a central fluid passageway extending therethrough in communication with the interior of the container and the exterior of the container, comprising:

a generally flat circular backing plate having a central axis, a plurality of smaller holes therethrough, and snap fit cover engagement means on the circumference thereof for releasably engaging a cover member;

offset mounting means on said backing plate disposed in offset relation to said central axis for mounting said backing plate on the existing tubular drain outlet such that said backing plate central axis is disposed in offset relation to the tubular drain outlet;

a generally dome-shaped cover having a dome-shaped end surface and a generally cylindrical peripheral side wall defining an interior, a plurality of holes extending through said dome-shaped end surface, a plurality of circumferentially spaced inwardly recessed slots extending from said dome-shaped surface of said cover and terminating near a bottom of said peripheral side wall in inwardly spaced relation relative thereto defining openings into said interior of said cover at a terminal end of said recessed slots, and snap fit backing plate engagement means thereon for releasably engaging said snap fit cover engagement means of said backing plate, said dome-shaped end surface and said generally cylindrical peripheral side wall configuration of said cover preventing debris and flat objects from covering all of said holes, said slots, and said openings of said cover;

said snap fit cover engagement means on said backing plate circumference comprising a circumferential bead, and said snap fit backing plate engaging means on said cover comprising an annular channel in an interior surface of said cylindrical peripheral side wall of said cover, or vice versa, configured to removably engage said cover on said backing plate in snap fit relation such that said cover is removably engaged in snap-fit relation on said backing plate; wherein said smaller holes of said backing plate and said holes, said recessed slots and said openings of said dome-shaped cover allow a liquid in the interior of the container to pass therethrough into said cover interior and through the central fluid passageway of the existing tubular drain outlet to the exterior of the container, while preventing debris and objects from entering said cover interior and clogging or restricting the existing tubular drain outlet; and said offset mounting means on said backing plate is offset relative to said central axis a sufficient distance such that said cover and said backing plate are rotatable as a unit eccentrically about the existing tubular drain outlet to engage a circumferential portion of said generally cylindrical peripheral side wall of said cover on a bottom wall of the container to prevent debris and objects residing on the bottom wall of the container from covering said slots and openings disposed on the engaged circumferential portion of said side wall while allowing liquids to pass therethrough into said cover interior and through the central fluid passageway of the existing tubular drain outlet to the exterior of the container.

3. The strainer apparatus according to claim 2, wherein
said offset mounting means on said backing plate comprises an offset larger hole therethrough disposed in offset relation to said central axis sized to receive the threaded portion of the existing tubular drain outlet therethrough and allow relative rotation therebetween;
a nut adapted to be threadedly engaged on the threaded portion of the existing tubular drain outlet;
said backing plate is removably mounted on the existing tubular drain outlet with the threaded portion of the tubular drain outlet extending through said offset larger hole in said backing plate and said nut threadedly engaged thereon; and
said cover removably engaged in snap-fit relation on said backing plate to surround the externally threaded portion of the existing tubular drain outlet, said nut, and the central fluid passageway of the existing tubular drain outlet.

4. A method for preventing debris and objects from entering and clogging or restricting a tubular drain outlet in the wall of a container when draining liquid contents from the container, the container having an interior and exterior, the tubular drain outlet having an externally threaded tubular portion disposed on the interior of the container and a central fluid passageway extending therethrough in communication with the interior of the container and the exterior of the container, the method comprising the steps of:

providing a generally flat circular backing plate having a central axis, snap fit cover engagement means on the circumference thereof, a plurality of smaller holes therethrough, and offset mounting means on said backing plate disposed in offset relation to said central axis for mounting said backing plate on the existing tubular drain outlet;

providing a generally dome-shaped cover having a dome-shaped end surface and a generally cylindrical peripheral side wall defining an interior, a plurality of holes extending through said dome-shaped end surface, a plurality of circumferentially spaced inwardly recessed slots extending from said dome-shaped surface of said cover and terminating near a bottom of said peripheral side wall in inwardly spaced relation relative thereto defining openings into said interior of said cover at a terminal end of said recessed slots, and snap fit backing plate engagement means thereon for releasably engaging said snap fit cover engagement means of said backing plate;

mounting said backing plate in the interior of the container adjacent to the container wall such that said backing plate central axis is disposed in offset relation to the tubular drain outlet;

engaging said cover on said backing plate in snap fit relation such that said cover is removably engaged in snap-fit relation on said backing plate; and rotating said cover and said backing plate as a unit eccentrically about the tubular drain outlet to engage a circumferential portion of said generally cylindrical peripheral side wall of said cover on a bottom wall of the container; wherein said dome-shaped end surface and said generally cylindrical peripheral side wall configuration of said cover prevent debris and flat objects from covering all of said holes, said slots, and said openings of said cover;

said smaller holes of said backing plate and said holes, said recessed slots and said openings of said dome-shaped cover allow a liquid in the interior of the container to pass therethrough into said cover interior and through the central fluid passageway of the existing tubular drain outlet to the exterior of the container, while preventing debris and objects from entering said cover interior and clogging or restricting the existing tubular drain outlet; and said circumferential portion of said generally cylindrical peripheral side wall of said cover engaged on the bottom wall of the container prevent debris and objects residing on the bottom wall of the container from covering said slots and openings disposed on the engaged circumferential portion of said side wall while allowing liquids to pass therethrough into said cover interior and through the central fluid passageway of the existing tubular drain outlet to the exterior of the container.

5. The method according to claim 4, wherein
said offset mounting means on said backing plate comprises an offset larger hole therethrough disposed in offset relation to said central axis sized to receive the threaded portion of the existing tubular drain outlet therethrough and allow relative rotation therebetween;

said step of mounting said backing plate in the interior of the container adjacent to the container wall comprises placing said offset larger hole on the tubular drain outlet such that the threaded portion of the tubular drain outlet extends through said offset larger hole in said backing plate; and threadedly engaging a nut on the threaded portion of the tubular drain outlet; and thereafter engaging said cover on said backing plate in snap fit relation such that said cover is removably engaged in snap-fit relation on said backing plate to surround the externally threaded portion of the tubular drain outlet, said nut, and the central fluid passageway of the existing tubular drain outlet.

\* \* \* \* \*